March 20, 1928.
H. SALINGER ET AL
1,663,353
TELEGRAPH CABLE WITH LOADING COILS
Filed Feb. 8, 1926
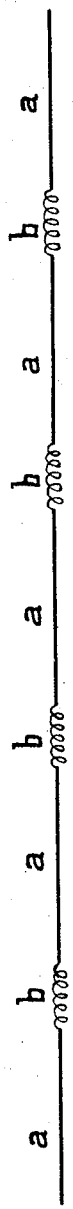
H. Salinger and
J. Stahl INVENTORS
By: Marks & Clerk
Attys.

Patented Mar. 20, 1928.

1,663,353

UNITED STATES PATENT OFFICE.

HANS SALINGER AND JOHANN STAHL, OF BERLIN, GERMANY.

TELEGRAPH CABLE WITH LOADING COILS.

Application filed February 8, 1926, Serial No. 86,956, and in Germany February 10, 1925.

It is known that the inductance of a cable assists the propagation of telegraph signals along the cable. As in the case of telephony the artificial increase in the inductance of the cable may be effected by surrounding the copper conductor with a material of high permeability or by inserting coils at regular intervals. In telephony the length of these intervals is determined by the Pupin rule. According to the latter the natural frequency of a coil section, viz, portion of the cable between two consecutive coils must lie above the highest frequency which can still be transmitted over the cable. The important factor in direct current telegraphy is a different one. When direct current telegraph signals pass through a coil loaded cable such as shown in the accompanying drawing, in which $b$ are the loading coils and $a$ the distance between the coils they are subject, in addition to the distortion which exists in every cable, to an additional change in their shape which arises from the crowding of the inductance at the points where the coils are placed. As in the case of telephony, also in this case it is important that the coils shall not be arranged too far apart from one another, as otherwise the additional distortion referred to will become too great. Now, as in the case of telephone cables also in the case of direct current telegraph cables the required condition may be expressed in a formula containing a relation between two frequencies. For this purpose use is made of the known conception of telegraphing or transmitting frequency, that is to say, of that fundamental frequency which corresponds to a series of uniform "changes" (spacing and signalling current) which are transmitted with the desired telegraphing or transmitting speed. This frequency is generally referred to in the literature as "dot frequency".

Both experiments and calculation show that the distance between the coils must be so chosen that the natural frequency of a coil section is at least three times the direct current telegraphing frequency. This rule which is entirely analogous to the Pupin rule determines the admissible maximum distance between two coils of a telegraph cable. The natural frequency of a coil section is $$\frac{1}{\pi\sqrt{LCs}}$$

Therein $L$ is the inductance of a coil, $C$ the capacity of the cable per kilometre, and $s$ the distance between the coils. Since as a rule the total inductance $L_0$ which it is desired to place into the cable, the length of which is $l$, is known beforehand we may write:

$$L = L_0 \frac{s}{l}$$

and thus we obtain for the natural frequency:

$$\frac{1}{\pi s}\sqrt{\frac{l}{L_0 C}}$$

$C$ and $L_0$ are given, so that the above formula actually determines the distance $s$ between the coils.

The natural frequency of a coil section may be increased beyond three times the telegraphing frequency. However, in that case, for the same total inductance, use has to be made of a greater number of coils, which renders the cable more expensive. The reason why an increased natural frequency may sometimes be advantageous is that the more numerous coils are smaller and can be laid more easily. Thus for instance, if the natural frequency is made six times instead of three times the telegraphing frequency, assuming the distance between the coils to be reduced to one-half, the inductance of the coils can be reduced to one-half and the coils thus have a smaller weight, whereby their laying is correspondingly facilitated.

What we claim is:—

Cable with loading coils exclusively for direct current telegraphy in which the natural frequency of a coil section is at least equal three times the direct current telegraphing frequency.

In testimony whereof we have signed our names to this specification.

Dr. HANS SALINGER.
JOHANN STAHL.